United States Patent [19]

Ogushi

[11] Patent Number: 4,985,617
[45] Date of Patent: Jan. 15, 1991

[54] MANUSCRIPT READER
[75] Inventor: Hiroshi Ogushi, Tokyo, Japan
[73] Assignee: Canon Kabushiki Kaisha, Tokyo, Japan
[21] Appl. No.: 370,862
[22] Filed: Jun. 23, 1989
[30] Foreign Application Priority Data Jun. 24, 1988 [JP] Japan ................. 63-154607

[51] Int. Cl.$^5$ ............................ H01J 40/14
[52] U.S. Cl. ................. 250/208.1; 250/561; 358/482
[58] Field of Search .......... 250/561, 578, 208.1; 358/488, 496, 482, 483

[56] References Cited

U.S. PATENT DOCUMENTS 4,417,148  11/1983  Otake ............................ 250/561
4,467,195   8/1984  Kawamura et al. .
4,553,036  11/1985  Kawamura et al. .
4,805,032   2/1989  Watanabe et al. ............... 358/482
4,899,227   2/1990  Yamada .

Primary Examiner—David C. Nelms
Assistant Examiner—Que Tan Le
Attorney, Agent, or Firm—Fitzpatrick, Cella, Harper & Scinto

[57] ABSTRACT

A device in which a manuscript is passed between moving member, such as a seamless rotating body, and a reading device to allow the latter to read an image of the manuscript. Facing the rotating body, a detector for detecting a front end of the manuscript is mounted to a support member to which the reading device is also mounted. It becomes thereby possible to improve accuracy in detection, and, at the same time, to provide the entire manuscript reader in a small size.

13 Claims, 7 Drawing Sheets

MANUSCRIPT READER

BACKGROUND OF THE INVENTION

1. Field of the Invention

This invention relates to a device for reading an image of a manuscript, and more particularly, to a device which can provide an improvement in reading accuracy and a small size, and in which a manuscript is read by a reading member disposed adjacent to the manuscript.

2. Description of the Related Art

FIG. 7 illustrates a conventional manuscript reader. In a reading unit 6 of the reader, a light-source lamp 4, such as a fluorescent lamp or the like, a holder 62 which also acts as a reflecting plate for the lamp 4, and a photosensing unit 5 are mounted to a box 61 formed as a single body made of a drawn material such as aluminum. A conventional device which is known as a contact-type sensor is used for the photosensing unit. An upper cover 20 is disposed at an upper portion of the reader. To the upstream side of the unit 6, there are provided a separating piece 23 urged in the clockwise direction (as shown in FIG. 7) around a shaft 23a for separating plural manusripts which have been introduced into the machine, and a roller 22 mounted to the main body of an apparatus on which the reader is provided, and rotating in the clockwise direction. Downstream of the roller 22, there is provided a sensor 24 as a detecting member, comprising a reflection-type photosensor for detecting a front end of a manuscript 1. When the cover 20 is opened rotating in a counterclockwise direction as indicated by arrow 25 around a shaft 21, a platen roller 2 made of rubber for carrying the manuscript is moved together with the separating piece 23 and the sensor 24 as one body with the cover 20 to open a carrying path along which, in operation, the manuscript 1 is carried.

In FIG. 7, there are also shown guide plates 26 for guiding the manuscript, mounted to the side of the cover 20 as a unit.

In the above-described configuration, when the front end of the manuscript 1 is detected by the sensor 24, the photosensing unit 5 starts the reading operation to read the manuscript, confirming that the manuscript has moved 20 mm from the position of the sensor 24.

Reading by means of the reading unit 6 is performed by illuminating the surface of the manuscript by light emitted from the lamp 4, and performing photoelectric conversion of an image by light reflected from the manuscript at the photosensing unit 5.

In the above-described configuration, the sensor 24 for detecting the front end of the manuscript is mounted to a member separate from the photosensing unit 6 for reading the manuscript. Hence, positional accuracy in the mounting of the sensor 24 and the reading unit 6 largely influences the determination of the timing for the start of reading of the manuscript. Accordingly, when mounting such a reader to the body, it is necessary to improve the accuracy of manufacture or installation (or both) of each part, or to perform a troublesome adjustment.

SUMMARY OF THE INVENTION

It is an object of the present invention to solve the above-described problems of the conventional reader.

It is another object of the present invention to provide a reader which can be made in a small size, easily mounted to the body of an apparatus and provided as a unit.

It is still another object of the present invention to provide a reader in which accuracy in the start of reading is improved, and at the same time, which can be made in a small size.

In order to achieve the above-described objects, a reader of the present invention comprises a manuscript-moving member which may perform an endless movement, such as a roller or the like, a body situated at a manuscript-movement path for guiding the side of an image of a manuscript, a manuscript-reading member mounted to the body, and a manuscript-detecting member provided at the body upstream of the reading member with respect to the direction of motion of the manuscript.

DETAILED DESCRIPTION OF THE PREFERRED EMBODIMENT

Figure 1:
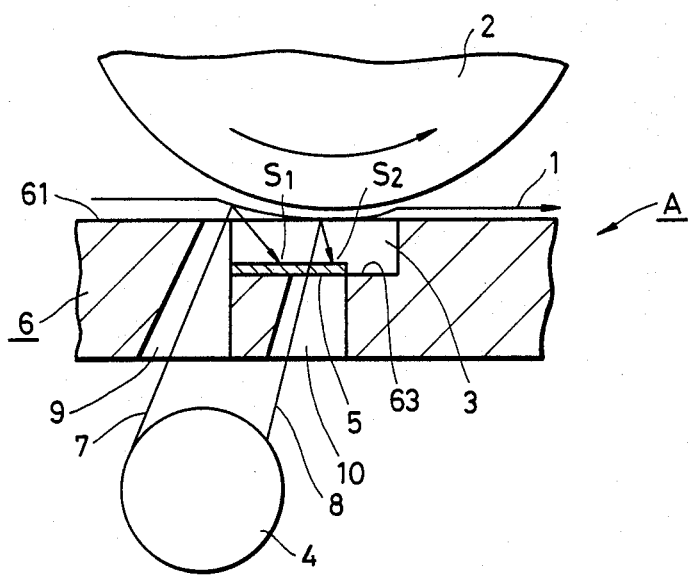
FIG. 1 is an enlarged cross-sectional view of a principal part of an image reading scanning device according to one preferred embodiment of the present invention.
Figure 2:
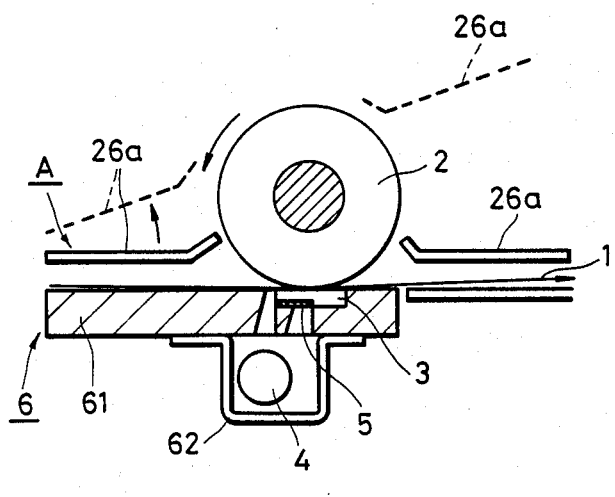
FIG. 2 is a vertical cross-sectional view of a reading unit of the device in FIG. 1.

FIGS. 1 and 2 illustrate an embodiment of the present invention. As shown in FIGS. 1 and 2, a reading unit A includes a photosensing unit 5 functioning as a reading device, such as a CCD or the like, within a seamless structure 6, and a lamp 4 mounted to the structure 6. The structure 6 includes a guide-plate member 61 for guiding paper the upper surface of which is a manuscript or other document or image, as well as the lamp 4 together with a holder 62 which also acts as a reflecting plate.

The photosensing unit 5 is disposed at a base portion of a recess 63 provided in the upper surface of the member 61, and the recess 63 is covered by a protective glass 3 at a portion over the phtosensing unit 5. On the glass 3, there is provided a white platen roller 2 contacting the glass to serve as a background for manuscript 1. The manuscript 1 is carried on a surface of the glass 3 by rotation of the roller 2 in the counterclockwise direction (in FIGS. 1 and 2, as indicated by the arrow in FIG.

1), the roller 2 pressing the manuscript 1 against the glass 3.

In the member 61 of the structure 6, holes 9 and 10 for providing light paths for guiding light from the lamp 4 to the surface of the manuscript are formed side by side in the scanning direction of the manuscript perpendicular to the moving direction of the manuscript. The hole 10 is for reading an image of the manuscript, and the hole 9 to the upstream side of the hole 10 is for use in detecting the front end of the manuscript. Guide plates 26a for the manuscript 1, placed before and after the roller 2, may also be provided arranged to be openable by rotation around one end of the combination of the plates 26a as shown by a dotted line in FIG. 2.

The light passing through the light paths 7 and 8 provided by the two holes 9 and 10 arrives at the photosensing unit 5 after being reflected from the manuscript. The photosensing unit 5 is divided into portions $S_1$ and $S_2$, and the distance between them is set at 3 mm. The portion $S_1$ is used for detecting the front end of the manuscript, and the portion $S_2$ is used for reading the manuscript. In the above-described configuration, a single lamp is used both for detecting the front end and for reading.

Figure 8:
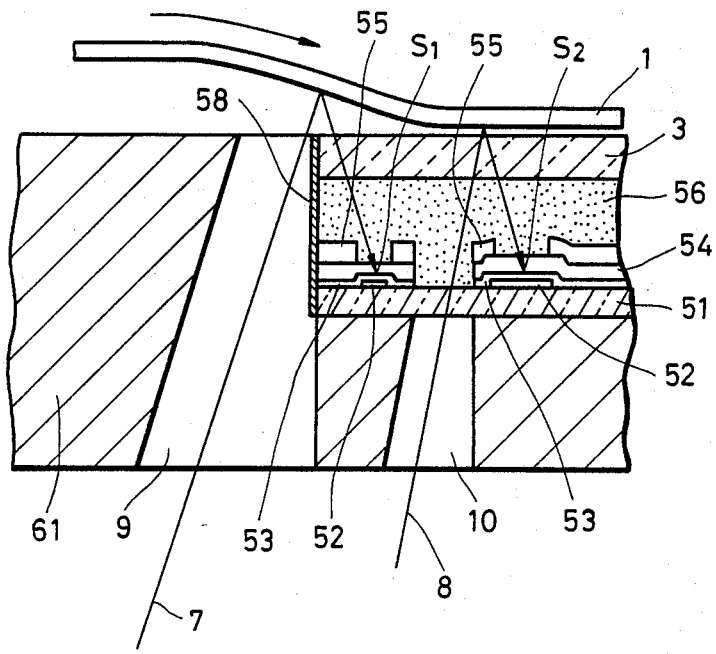
FIG. 8 is an enlarged cross-sectional view of a photosensing unit of a reading unit in the first preferred embodiment.

FIG. 8 is a partially enlarged view of the above-described photosensing unit 5. In FIG. 8, on a glass substrate 51, there are provided a layer 52 acting as a lower electrode as well as an obturating layer made of chromium (Cr) for obturating direct light from the lamp 4, an insulating layer 53 made of $SiN_x$, a photoconductive layer 54 made of amorphous silicon (A-Si) for sensing the light reflected from the manuscript, and an upper electrode layer 55 made of aluminum (Al). Thereupon, there are further a protective layer 56 made of polyimide and a protective layer of glass 3 which also acts as a guide surface for the manuscript 1. At the side of the photosensing unit 5 in the hole 9, there is provided an obturating layer 58 for preventing unnecessary and unwanted light from arriving at the photosensing unit.

Operation of the above-described photosensing unit will be hereinafter described.

When the manuscript 1 is carried along its movement path, the light passing through the light path 7 is reflected from the front end of the manuscript, and the front end of the manuscript is detected by the portion $S_1$ of the photosensing unit. After the lapse of a predetermined time, reading of the light passed through the light path 8 is started by the portion $S_2$ as an image of the manuscript. Once it has been detected that light reflected from the surface of the manuscript is no longer reaching portion $S_1$ of the photosensor, the reading operation is stopped after the lapse of a predetermined time from such detection.

By providing such a configuration, it becomes possible to provide detection means to detect the front end of the manuscript and means for reading an image, closer to each other by about 17 mm compared with a case in which these two means are separately provided, as in conventional readers. Furthermore, since the member 61, to which the above-described portions $S_1$ and $S_2$ are mounted, consists of a single body made of a single plate of aluminum, reading accuracy is high and error is small. Hence, accidents, such that reading is begun later than it should due to the front end of the manuscript being missed or reading is started before the manuscript has arrived, disappear. Similar effects are also provided relative to improvement in reading accuracy at the rear end of the manuscript. Furthermore, in the above-described embodiment, since the light source is used in common for edge detection and for reading, there is an effect of reducing the number of components, and it becomes thereby possible to reduce failure of components and the necessity of replacing components.

Figure 3:
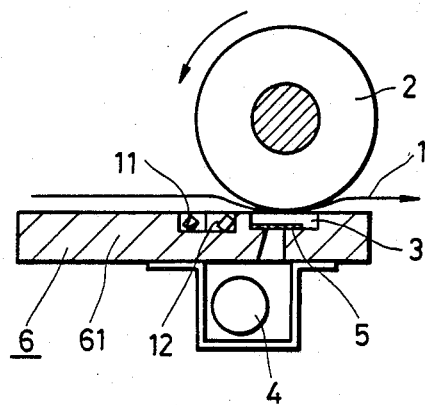
FIG. 3 is a vertical cross-sectional view of a reading unit of a device according to a second preferred embodiment of the present invention.
Figure 4:
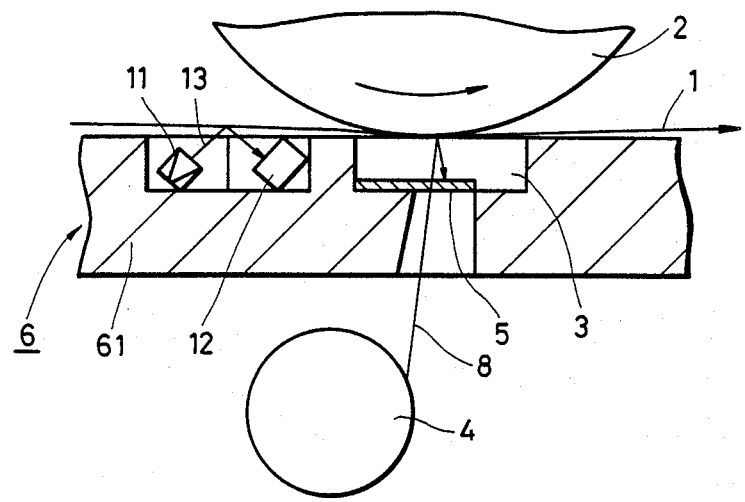
FIG. 4 is an enlarged view near an image reading position in FIG. 3.

FIGS. 3 and 4 illustrate another embodiment of the present invention. In FIGS. 3 and 4, a light source 11, such as a gallium arsenide infrared LED or the like, is a light source exclusively for a photosensing unit 12 using a phototransistor, and is mounted to the member 61 identical to that described above together with manuscript reading means 5 identical to the above-described portion $S_2$. In this case, the distance between the two photosensing units is about 10 mm.

In the above-described configuration, when the manuscript is carried, the light emitted from the light source 11 of the manuscript-end detecting unit is received at the exclusive photosensing unit 12 via a light path 13 to detect the front end of the manuscript. After a predetermined time interval, reading is started via the light path 8 as in the above-described embodiment. Subsequently, the rear end is detected by the same manuscript-end detecting unit, and reading is stopped a predetermined time interval later.

Figure 5:
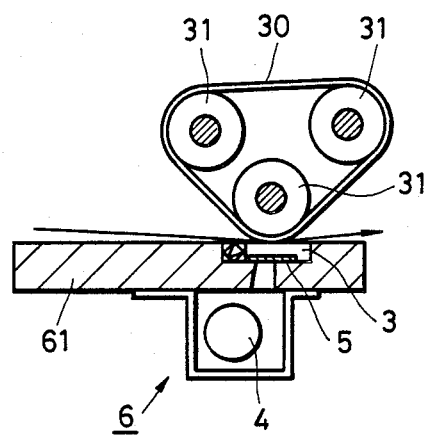
FIG. 5 is a vertical cross-sectional view of a reading unit of a device according to a third preferred embodiment of the present invention.
Figure 6:
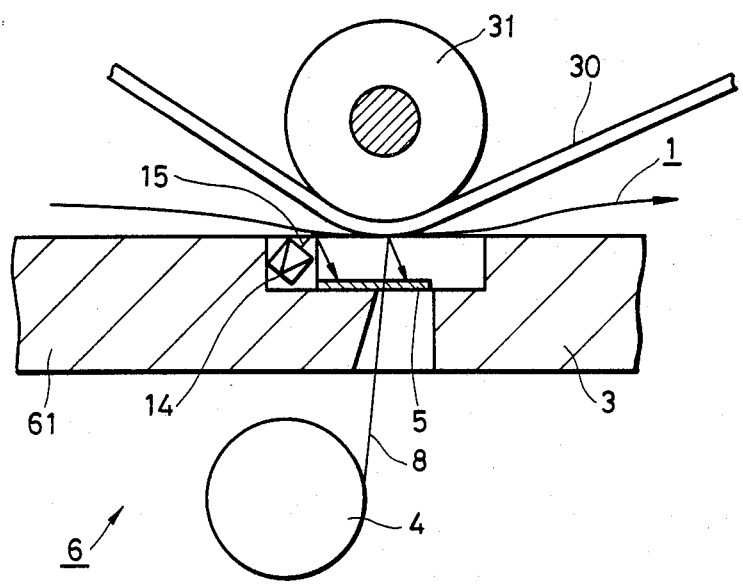
FIG. 6 is an enlarged view of an image reading position in FIG. 5.
Figure 7:
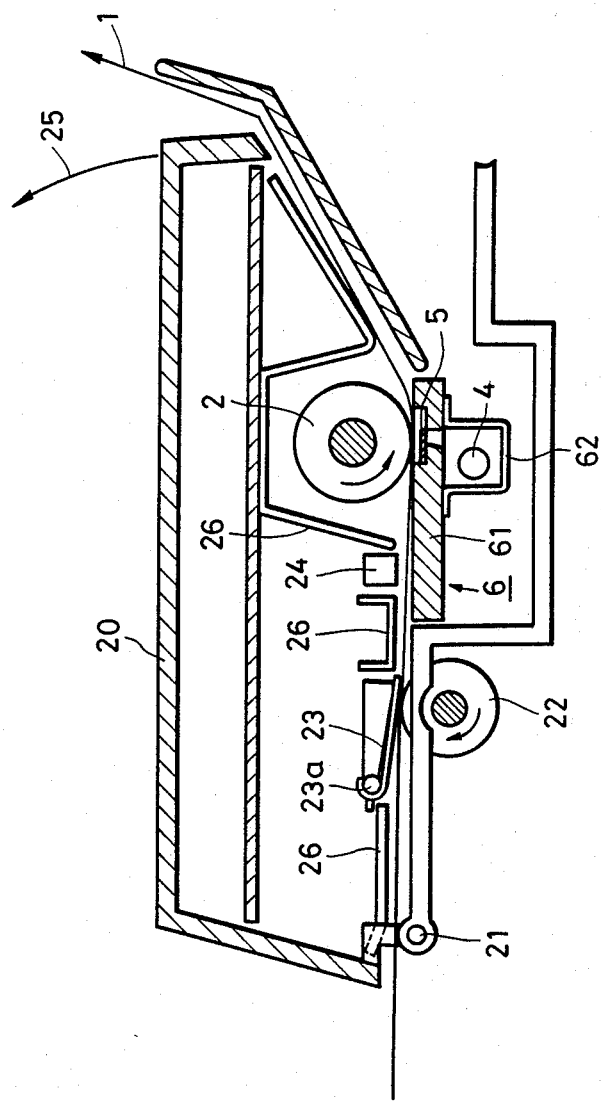
FIG. 7 is a vertical cross-sectional view of a conventional image reader.

FIGS. 5 and 6 illustrate a third embodiment of the present invention. The configuration is different from that of the above-described embodiments in that the photosensing unit for manuscript-end detection and the photosensing unit for reading the manuscript are formed on one and the same film, that is, the photosensing unit 5 is used in common. Furthermore, as the manuscript carrying means, a rubber belt 30 and driving rollers 31 supporting the belt are used instead of the roller 2 of the earlier-described embodiments.

In the above-described configuration, when the manuscript is carried, the light emitted from a light source 14 for manuscript-end detection using a GaAs infrared LED is reflected, and the reflected light is detected at the photosensing unit 5 via a light path 15. After a predetermined time interval, reading is started via the light path 8 as in the above-desribed embodiment. The rear end is then detected by the same detecting means, and reading is stopped after a predetermined time interval.

Figure 9:
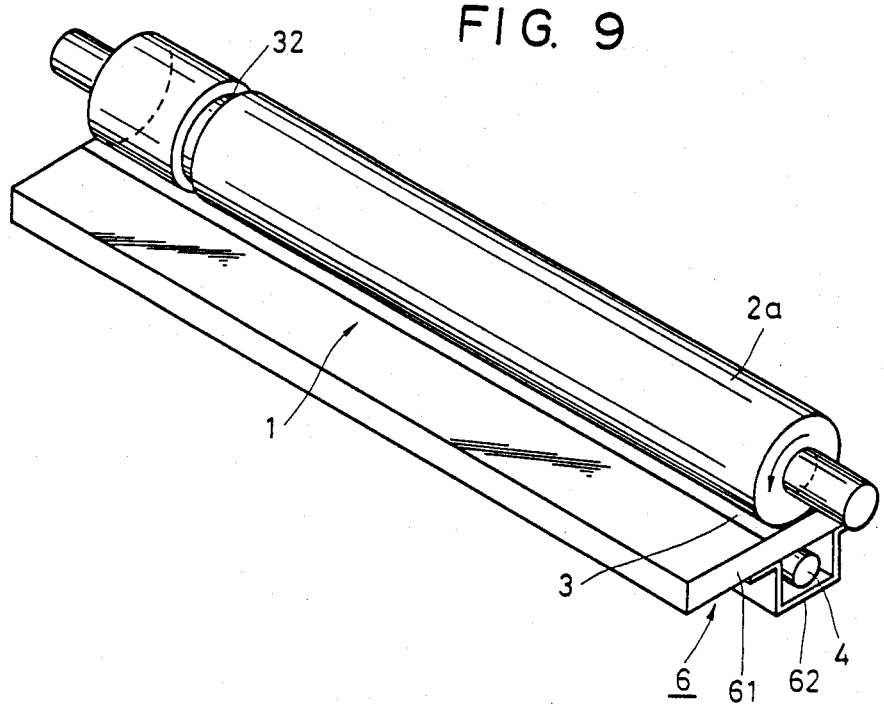
FIG. 9 is a perspective view of an image reading unit in a fourth preferred embodiment.
Figure 10:
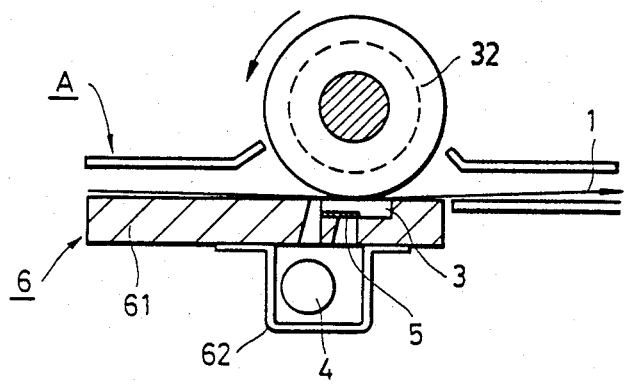
FIG. 10 is a vertical cross-sectional view of an image reading unit in the fourth preferred embodiment.

FIGS. 9 and 10 illustrate a fourth embodiment of the present invention. A recess 32 is provided in roller 2a (which moves the manuscript as does roller 2 in the embodiment of FIGS. 1 and 2) at a position corresponding to the manuscript-end detection member. The above-described portions $S_1$ and $S_2$ can be situated closer to each other, due to this recess provided entirely around the circumference of the roller 2a, and it becomes thus possible to avoid misjudging between the white surface of the roller 2 and the white color of the surface of the manuscript.

According to the present embodiment, it becomes possible to provide the portions $S_1$ and $S_2$ in the first embodiment as close as 1–2 mm to each other. It becomes thereby possible to further enhance the above-described effect.

Figure 11:
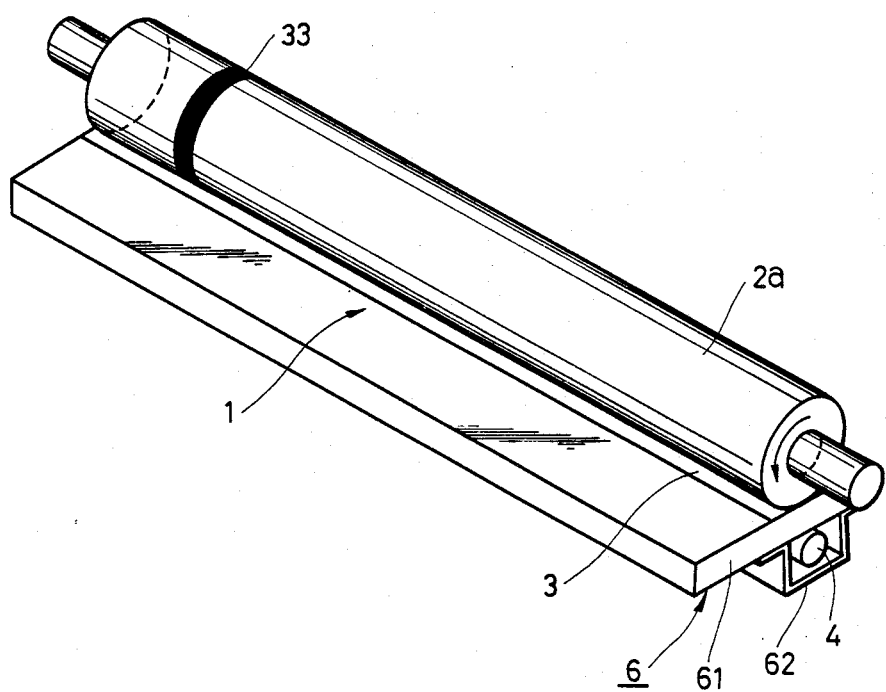
FIG. 11 is a perspective view of an image reading unit in a fifth preferred embodiment.

FIG. 11 illustrates an embodiment in which the above-described platen roller is further modified. In the present embodiment, in place of the recess 32 provided at the roller 2a in FIG. 9, the circumference of the roller 2a is colored at a position 33 corresponding to the front-end detection means. For the coloring, it is possible to select an arbitrary color other than black, such as yellow and the like, depending on the color sensitivity of the photosensing unit.

It becomes thereby also possible to obtain the same effect as that in the embodiment in FIG. 9.

It is to be noted that, in the above-described embodiments, as the guide member in a single body for guiding the side of an image of the manuscript and mounting the photosensing unit, a single body made of synthetic resin may also be used instead of a single body formed by cutting from one sheet of aluminum plate as described above. As the photosensing unit, in place of the above-described unit, made by film forming, a conventional device for reading which has separately been formed may be fixed to a member consisting of a single body. Relative to the light source, a conventional light source may be used selected in accordance with the material of the photosensing unit, other than an LED and a fluorescent lamp. Furthermore, relative to the pressing relationship between the carrying member, such as a roller or the like, and the guide member, either of them may be fixed.

As described above, according to the present invention, it is possible to house a manuscript-end detection means within a single member of a reading unit for reading a manuscript, and thereby to dispose a manuscript-end detecting position and a manuscript reading position closer to each other than is conventionally possible. Hence, it is possible to reduce an error in reading start and end positions in spite of any differences or variations in the thickness of paper, coefficient of friction, environment or the like.

What is claimed is:

1. A device for reading a passing manuscript, comprising:
    a manuscript moving member for performing an endless movement to move the manuscript;
    a body comprising a guide member situated at a carrying path of the manuscript, for guiding a movement of the manuscript by said manuscript moving member, said body comprising a single seamless structure;
    a manuscript reading member disposed within said body at a position adjacent to said moving member; and
    a manuscript detecting member situated within said body to an upstream side of said reading member with respect to a direction of motion of the manuscript.

2. A device for reading a passing manuscript according to claim 1, wherein said manuscript reading member comprises a semiconductor and a transparent support member, said device further comprising a light source for illuminating the manuscript, situated to a side of the transparent support member which side is opposite to a side of said transparent support member of which the manuscript passes.

3. A device for reading a passing manuscript according to claim 2, wherein said manuscript detecting member comprises an optical detector.

4. A device for reading a passing manuscript according to claim 3, wherein said light source provides light for said manuscript detecting member to use in detecting motion and for use in reading of the manuscript by said reading member.

5. A device for reading a passing manuscript, comprising:
    a roller for moving the manuscript;
    a body having a portion which serves as a guide member situated at a path of the manuscript, for guiding movement of the manuscript by said roller;
    a manuscript reading member disposed to be supported by said body at a position adjacent to said roller;
    a manuscript detecting member situated at an upstream side of said reading member with respect to a direction of motion of the manuscript and disposed to be supported by a part of said body; and
    a light source for illuminating the manuscript, provided at a side of said path opposite to a side on which said roller is disposed, said light source providing light to both said manuscript reading member and said manuscript detecting member.

6. A device for reading a passing manuscript according to claim 5, wherein said manuscript reading member comprises a transparent support member and a semiconductor formed on said transparent support member by a film forming method.

7. A device for reading a passing manuscript according to claim 6, wherein said body is a plate-like single body made of a synthetic resin.

8. A device for reading a passing manuscript according to claim 6, wherein said body is a single body made of a metal plate.

9. A device for reading a passing manuscript, comprising:
    a manuscript moving member for performing an endless movement to move the manuscript;
    a first guide member situated at a path of the manuscript for guiding movement of the manuscript by said moving member, said first guide member comprising a seamless structure;
    a manuscript reading member disposed to be supported within said first guide member at a position adjacent to said moving member;
    a manuscript detecting member situated within said first guide member at an upstream side of said reading member with respect to a direction of motion of the manuscript; and
    a second guide member facing said first guide member, situated at the side of said manuscript moving member and connectable to said first guide member, for guiding a surface of the manuscript opposite to a manuscript surface guided by said first guide member.

10. A device for reading a passing manuscript according to claim 9, wherein said manuscript reading member comprises a semiconductor and a transparent support member on which said semiconductor is disposed, and wherein said device further comprises a light source for illuminating the manuscript situated to a side of said transparent support member opposite to a side at which the manuscript passes.

11. A device for reading a passing manuscript according to claim 10, wherein said manuscript detecting member comprises an optical detector.

12. A device for reading a passing manuscript according to claim 11, wherein said light source provides light both for use by said manuscript detecting member in detecting motion and for use by said reading member in reading the manuscript.

13. A device according to claim 5, wherein said seamless body has a first light path for directing light to the manuscript detecting member, and a second light path for directing light to the manuscript reading member.

* * * * *